(12) United States Patent
Baniel et al.

(10) Patent No.: US 8,595,368 B2
(45) Date of Patent: Nov. 26, 2013

(54) METHOD AND SYSTEM FOR PROVIDING MOBILITY MANAGEMENT IN A NETWORK

(75) Inventors: Uri Baniel, Marlborough, MA (US); Tarek Abou-Assali, Boston, MA (US); Yusun Kim Riley, Marlborough, MA (US)

(73) Assignee: Camiant, Inc., Marlborough, MA (US)

( * ) Notice: Subject to any disclaimer, the term of this patent is extended or adjusted under 35 U.S.C. 154(b) by 0 days.

(21) Appl. No.: 12/479,179

(22) Filed: Jun. 5, 2009

(65) Prior Publication Data

US 2010/0121960 A1    May 13, 2010

Related U.S. Application Data

(60) Provisional application No. 61/059,133, filed on Jun. 5, 2008.

(51) Int. Cl.
*G06F 15/16* (2006.01)
*G06F 15/173* (2006.01)

(52) U.S. Cl.
USPC .......................................... 709/228; 709/224

(58) Field of Classification Search
USPC ................................................ 709/224, 228
See application file for complete search history.

(56) References Cited

U.S. PATENT DOCUMENTS

| | | | |
|---|---|---|---|
| 6,141,686 A | 10/2000 | Jackowski et al. | |
| 6,651,101 B1 | 11/2003 | Gai et al. | |
| 6,661,780 B2 | 12/2003 | Li | |
| 6,880,005 B1 | 4/2005 | Bell et al. | |
| 7,209,962 B2 | 4/2007 | Boden | |
| 7,289,498 B2 | 10/2007 | Yu et al. | |
| 7,581,249 B2 | 8/2009 | Bussiere et al. | |
| 7,719,966 B2 | 5/2010 | Luft et al. | |
| 7,940,683 B2 | 5/2011 | Dolganow et al. | |
| 8,042,148 B2 | 10/2011 | Andreasen et al. | |
| 8,131,831 B1 | 3/2012 | Hu | |

(Continued)

FOREIGN PATENT DOCUMENTS

| CN | 102160452 A | 8/2011 |
|---|---|---|
| EP | 1 551 144 A1 | 7/2005 |

(Continued)

OTHER PUBLICATIONS

International Search Report for PCT/US2009/046395 mailed on Dec. 28, 2009, 3 pages.

(Continued)

*Primary Examiner* — Hee Soo Kim
(74) *Attorney, Agent, or Firm* — Jenkins, Wilson, Taylor & Hunt, P.A.

(57) ABSTRACT

A method implemented by a gateway device which handles sessions over a network to which the gateway device is connected and which also enforces conditions of service provided to those network sessions, the method involving: receiving from a policy server a policy rules package, wherein the policy rules package specifies a set of rules that are to be applied to certain sessions handled by the gateway device and a set of criteria for identifying among a plurality of subscribers a group of all subscribers to which the rules are to be applied by the gateway device; based on set of criteria in the policy rules package identifying all subscribers with currently active sessions to whom the policy rules are to be applied; and applying the set of rules to the sessions of the identified subscribers.

3 Claims, 4 Drawing Sheets

(56) References Cited

U.S. PATENT DOCUMENTS

| | | | |
|---|---|---|---|
| 8,146,133 | B2 | 3/2012 | Moon et al. |
| 8,159,941 | B2 | 4/2012 | Dolganow et al. |
| 8,250,646 | B2 | 8/2012 | Zheng |
| 8,429,268 | B2 | 4/2013 | Riley et al. |
| 8,433,794 | B2 | 4/2013 | Baniel et al. |
| 8,458,767 | B2 | 6/2013 | Riley et al. |
| 2002/0143914 | A1 | 10/2002 | Cihula |
| 2002/0188562 | A1 | 12/2002 | Igarashi et al. |
| 2003/0208523 | A1 | 11/2003 | Gopalan et al. |
| 2004/0111519 | A1 | 6/2004 | Fu et al. |
| 2005/0088977 | A1 | 4/2005 | Roch et al. |
| 2005/0122945 | A1 | 6/2005 | Hurtta |
| 2006/0013191 | A1 | 1/2006 | Kavanagh |
| 2006/0233101 | A1 | 10/2006 | Luft et al. |
| 2007/0004393 | A1 | 1/2007 | Forsberg et al. |
| 2007/0066286 | A1 | 3/2007 | Hurtta |
| 2007/0121812 | A1* | 5/2007 | Strange et al. .............. 379/70 |
| 2007/0159976 | A1* | 7/2007 | Dekeyzer et al. .............. 370/236 |
| 2007/0220251 | A1 | 9/2007 | Rosenberg et al. |
| 2007/0226775 | A1 | 9/2007 | Andreasen et al. |
| 2007/0242692 | A1 | 10/2007 | Limb et al. |
| 2007/0286117 | A1 | 12/2007 | Balasubramanian et al. |
| 2008/0046963 | A1* | 2/2008 | Grayson et al. .............. 726/1 |
| 2008/0076388 | A1 | 3/2008 | Nochimowski et al. |
| 2008/0120700 | A1 | 5/2008 | Pandey et al. |
| 2008/0137541 | A1 | 6/2008 | Agarwal et al. |
| 2008/0201772 | A1 | 8/2008 | Mondaeev et al. |
| 2008/0232376 | A1* | 9/2008 | Huang et al. .............. 370/395.3 |
| 2008/0276305 | A1 | 11/2008 | Chan et al. |
| 2008/0313708 | A1 | 12/2008 | Khan et al. |
| 2009/0089418 | A1 | 4/2009 | Saha et al. |
| 2009/0177650 | A1 | 7/2009 | Petersson et al. |
| 2009/0196225 | A1 | 8/2009 | Avila Gonzalez et al. |
| 2009/0222538 | A1 | 9/2009 | Takahashi et al. |
| 2009/0227231 | A1 | 9/2009 | Hu et al. |
| 2009/0228956 | A1 | 9/2009 | He et al. |
| 2009/0285225 | A1 | 11/2009 | Dahod |
| 2009/0307028 | A1 | 12/2009 | Eldon et al. |
| 2009/0323536 | A1 | 12/2009 | Liu et al. |
| 2010/0040047 | A1* | 2/2010 | Castellanos Zamora et al. .............. 370/352 |
| 2010/0185488 | A1 | 7/2010 | Hogan et al. |
| 2010/0235877 | A1 | 9/2010 | Hu et al. |
| 2011/0022702 | A1 | 1/2011 | Riley et al. |
| 2011/0022722 | A1 | 1/2011 | Castellanos Zamora et al. |
| 2011/0041182 | A1 | 2/2011 | Stenfelt |
| 2011/0111767 | A1 | 5/2011 | Livanos |
| 2011/0167471 | A1 | 7/2011 | Riley et al. |
| 2011/0170412 | A1 | 7/2011 | Ramadas et al. |
| 2011/0202653 | A1 | 8/2011 | Riley et al. |
| 2011/0219426 | A1 | 9/2011 | Kim et al. |
| 2011/0225280 | A1 | 9/2011 | Delsesto et al. |
| 2011/0225306 | A1 | 9/2011 | Delsesto et al. |
| 2011/0225309 | A1 | 9/2011 | Riley et al. |
| 2011/0296489 | A1 | 12/2011 | Fernandez Alonso et al. |
| 2012/0084425 | A1 | 4/2012 | Riley et al. |
| 2012/0131165 | A1 | 5/2012 | Baniel et al. |

FOREIGN PATENT DOCUMENTS

| | | |
|---|---|---|
| EP | 2 045 974 A1 | 4/2009 |
| KR | 10-2006-0028042 | 3/2006 |
| KR | 10-2009-0027861 | 3/2009 |
| WO | WO 2007/092573 A2 | 8/2007 |
| WO | WO 2008/000287 A1 | 1/2008 |
| WO | WO 2008/114217 A1 | 9/2008 |
| WO | WO 2009/149341 | 12/2009 |
| WO | WO 2010/086013 A1 | 8/2010 |
| WO | WO 2011/011790 A2 | 1/2011 |
| WO | WO 2011/082036 A2 | 7/2011 |
| WO | WO 2011/100684 A2 | 8/2011 |
| WO | WO 2011/109821 A2 | 9/2011 |
| WO | WO 2011/115991 A2 | 9/2011 |

OTHER PUBLICATIONS

Commonly-assigned, co-pending U.S. Appl. No. 13/157,052 for "Methods, Systems, and Computer Readable Media for Providing Nested Policy Configuration in a Communications Network", (Unpublished, filed Jun. 9, 2011).

Commonly-assigned, co-pending International Application No. PCT/US2010/0061589 for "Methods, Systems, and Computer Readable Media for Providing Group Policy Configuration in a Communications Network Using a Fake User," (Unpublished, filed Dec. 21, 2010).

Commonly-assigned, co-pending U.S. Appl. No. 12/973,186 for "Methods, Systems, and Computer Readable Media for Providing Group Policy Configuration in a Communications Network Using a Fake User," (Unpublished, filed Dec. 21, 2010).

"Chapter 1: Overview of GPRS and UMTS," Cisco GGSN release 9.0 Configuration Guide, Cisco IOS Release 12.4(22)YE, pp. 1-1-1-16 (Aug. 4, 2009).

"Introduction to Diameter," Wikipedia, pp. 1-12 (Downloaded from the Internet on May 15, 2009).

"Diameter Credit-Control Application," Wikipedia, pp. 1-7 (Downloaded from the Internet on May 13, 2009).

"Diameter (Protocol)," Wikipedia, pp. 1-8 (Downloaded from the Internet on May 13, 2009).

"File: GPRS Core Structure.phg," Wikipedia, pp. 1-3 (Downloaded from the Internet on May 13, 2009).

"GPRS Core Network," Wikipedia, pp. 1-6 (Downloaded from the Internet on May 13, 2009).

"GPRS Network Architecture," DenMasBroto, pp. 1-2 (Downloaded from the Internet on May 13, 2009) (May 28, 2008).

Agilent Technologies, "Understanding DSLAM and BRAS Access Devices," White Paper, pp. 1-15 (2006).

"GPRS Tutorial," MorganDoyle Limited, pp. 1-13 (Publication Date Unknown).

Commonly-assigned, co-pending U.S. Appl. No. 13/225,390 for "Method and System for Providing Mobility Management in Network", (Unpublished, filed Sep. 2, 2011).

Supplemental Notice of Allowability for U.S. Appl. No. 12/621,190 (Aug. 10, 2012).

Non-Final Official Action for U.S. Appl. No. 13/042,294 (Jun. 20, 2012).

Notice of Allowance and Fee(s) Due for U.S. Appl. No. 12/621,190 (May 29, 2012).

Non-Final Official Action for U.S. Appl. No. 13/225,390 (May 14, 2012).

Communication of European publication number and information on the application of Article 67(3) EPC for European Application No. 10803020.6 (May 4, 2012).

Applicant-Initiated Interview Summary for U.S. Appl. No. 12/621,190 (Feb. 7, 2012).

Notification of Transmittal of the International Search Report and the Written Opinion of the International Searching Authority, or the Declaration for International Application No. PCT/US2011/027427 (Nov. 15, 2011).

Notification of Transmittal of the International Search Report and the Written Opinion of the International Searching Authority, or the Declaration for International Application No. PCT/US2011/028520 (Oct. 31, 2011).

Notification of Transmittal of the International Search Report and the Written Opinion of the International Searching Authority, or the Declaration for International Application No. PCT/US2011/024753 (Oct. 28, 2011).

Notification of Transmittal of the International Search Report and the Written Opinion of the International Searching Authority, or the Declaration for International Patent Application No. PCT/US2010/061589 (Sep. 26, 2011).

Non-Final Official Action for U.S. Appl. No. 12/621,190 (Aug. 3, 2011).

Notification of Transmittal of the International Search Report and the Written Opinion of the International Searching Authority, or the Declaration for International Application No. PCT/US2010/043258 (Feb. 28, 2011).

(56) References Cited

OTHER PUBLICATIONS

"3rd Generation Partnership Project; Technical Specification Group Core Network and Terminals; Policy and Charging Control over Rx reference point (Release 9)," 3GPP TS 29.214, V9.3.0, pp. 1-45 (Mar. 2010).
"Universal Mobile Telecommunications System (UMTS); LTE; Policy and charging control over Rx reference point (3GPP TS 29.214 version 9.2,0 Release 9)," ETSI TS 129 214, V9.2.0 (Jan. 2010).
"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).
3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).
Hakala et al., "Diameter Credit-Control Application," Network Working Group RFC 4006, pp. 1-114 (Aug. 2005).
Zhou et al., "Prophet Address Allocation for Large Scale MANETs," Ad Hoc Networks, vol. 1, Issue 4, pp. 423-434 (Nov. 2003).
Calhoun et al., "Diameter Base Protocol," RFC 3588, pp. 1-147 (Sep. 2003).
Ponnappan et al., "A Policy Based QoS Management System for the IntServ/DiffServ Based Internet," Policies for Distributed Systems and Networks, pp. 159-168 (2002).
Notice of Allowance and Fee(s) Due for U.S. Appl. No. 13/225,390 (Oct. 9, 2012).
European Search Report for European Patent Application No. EP 09 75 9499 (Sep. 12, 2012).
Non-Final Official Action for U.S. Appl. No. 12/973,186 (Aug. 24, 2012).
Applicant-Initiated Interview Summary for U.S. Appl. No. 13/225,390 (Aug. 13, 2012).
3rd Generation Partnership Project, "Technical Specification Group Core Network and Terminals; Policy and Charging Control over Gx Reference Point," 3GPP TS 29.212, V8.0.0, Release 8 (May 2008).
Non-Final Office Action for U.S. Appl. No. 13/157,052 (Jun. 6, 2013).
Final Office Action for U.S. Appl. No. 12/973,186 (May 22, 2013),.
Non-Final Office Action for U.S. Appl. No. 13/048,607 (Mar. 4, 2013).
Non-Final Office Action for U.S. Appl. No. 13/048,629 (Feb. 15, 2013).
Non-Final Office Action for U.S. Appl. No. 13/048,597 (Feb. 1, 2013).
Notice of Allowance and Fee(s) Due for U.S. Appl. No. 13/042,294 (Jan. 30, 2013).
Communication of European Publication Number and Information on the Application of Article 67(3) EPC for European Patent Application No. 11756855.0 (Jan. 4, 2013).
Notice of Allowance and Fee(s) Due for U.S. Appl. No. 12/621,190 (Dec. 27, 2012).
Communication of European Publication Number and Information on the Application of Article 67(3) EPC for European Patent Application No. 11751508.0 (Dec. 12, 2012).
Communication of European publication number and information on the application of Article 67(3) EPC for European Application No. 11742958.9 (Nov. 21, 2012).
3GPP, "Policy and Charging Control Over Rx Reference Point," 3GPP ETSI TS 29.214 version 8.3.0 Release 8 (Feb. 2009).
Final Office Action for U.S. Appl. No. 13/048,597 (Jun. 21, 2013).
First Office Action for Chinese Patent Application No. 200980130515.0 (Apr. 24, 2013).

\* cited by examiner

METHOD AND SYSTEM FOR PROVIDING MOBILITY MANAGEMENT IN A NETWORK

This application claims the benefit of U.S. Provisional Application No. 61/059,133, filed Jun. 5, 2008, the contents of which are incorporated herein by reference.

TECHNICAL FIELD

This invention generally relates to communication networks and more particularly to policy rules distribution and enforcement in such networks.

SUMMARY OF THE INVENTION

In one aspect, at least some of the embodiments described herein involve creating policy rules packages which can be installed out of band and whose definition can be dynamically updated. An example for a policy rules package could be Video-Service-for-Golden-Tier-Users-in-Weekend. The policy rules package includes PCC attributes which may be updated on the fly. Such attributes may include charging and QoS attributes, among others.

Also described is a mechanism for dynamically provisioning new values for the attributes and signaling the PCRF about the provisioning. At any subsequent time when the conditions for rules installment are met, the PCRF will install into the PCEF the broad-wide rule. The installment is accomplished by indicating the package-name as well as a Boolean flag indicating whether there is an attributes update, which will trigger the PCEF to: (1) download the updated package if the current copy at the PCEF is out of date; and (2) enforce the rule per the new policy rules package attributes.

The PCRF persists state of when-was-last-update-time of the package. The PCEF does not need to keep such state, since the Boolean flag indicates whether its copy is out of date.

The installment can be done out of band, since the current Diameter based PCC-rules-installment-method (Gx/Ty) has the session limitation, which makes it user based. A special case of out-of-band may use either an API method or a Diameter command with a "fake" user. This "fake" user will only enable an open diameter channel for broad-wide rule installment.

The network of the operator/service provider may have network elements, which are isolated from each other, and thus do not share information about the active users. This information (e.g., location, access network type) can assist network elements to make smart decisions based on their current knowledge of the user. For example, some video conference server may want to connect the user to a conference call ad-hoc if the user is online and is served by access network, which support BW required for video).

The PCRF persists such information locally in its internal databases, for use in its policy evaluations. In accordance with another aspect of the inventions described herein, the PCRF which is centrally located and has awareness of the entire network propagates the static or dynamic information associated with the subscriber to other entities in the network. Policy rules are also configured on the PCRF to support the notification to other entities in the network based on events from PCEFs (e.g. RAT type change, or volume threshold exceeded). The notifications can include information about the subscriber/session so the receiver of the notifications can act on the information as necessary.

In general, in one aspect, the invention features a method implemented by a gateway device which handles sessions over a network to which the gateway device is connected and which also enforces conditions of service provided to those network sessions. The method involves: receiving from a policy server a policy rules package, wherein the policy rules package specifies a set of rules that are to be applied to certain sessions handled by the gateway device and a set of criteria for identifying among a plurality of subscribers a group of all subscribers to which the rules are to be applied by the gateway device; based on set of criteria in the policy rules package identifying all subscribers with currently active sessions to whom the policy rules are to be applied; and applying the set of rules to the sessions of the identified subscribers.

Preferred embodiments include one or more of the following features. The method also involves requesting from the policy server policy rules packages associated with a fictitious user, wherein receiving the policy rules package from the policy server is in response to requesting policy rules packages from the policy server. The method also involves: requesting from a policy server policy rules packages associated with a fictitious user; and receiving from the policy server a plurality of policy rules package associated with the fictitious user, the first-mentioned policy rules package being among said plurality of policy rules packages. Each of the policy rules package among the plurality of policy rules packages other than the first-mentioned policy rules package, specifies a corresponding set of rules that are to be applied to corresponding certain sessions handled by the gateway device and a corresponding set of criteria for identifying among a plurality of subscribers a corresponding group of all subscribers to which the rules are to be applied by the gateway device. The method also involves: for each of the plurality of policy rules packages other than the first-mentioned policy rules package, applying the corresponding set of criteria in that policy rules package to identify all subscribers with currently active sessions to whom the policy rules are to be applied; and applying the corresponding set of rules to the sessions of the identified subscribers. The set of criteria include geographical criteria for determining the subscribers who are members of the group. The policy rules package is a system-oriented policy rules package. The set of rules include application layer criteria. The received policy rules package includes an indication of whether the received policy rules package represents an update to a previously received policy rules package.

In general, in another aspect, the invention features a method implemented by a policy server which determines access and conditions of service to be provided to subscribers by a gateway device on a network. The method involves: receiving a policy rules package, wherein the policy rules package specifies a set of rules that are to be applied to certain sessions handled by the gateway device and a set of criteria for identifying among a plurality of subscribers a group of all subscribers to which the rules are to be applied by the gateway device; and forwarding the policy rules package to the gateway device for enforcement by the gateway device.

In general, in still another aspect, the invention features a method implemented by a policy server which determines access and conditions of service to be provided to subscribers by a gateway device on a network. The method involves: storing a plurality of policy rules packages in a local storage, wherein each of the policy rules packages of the plurality of policy rules packages specifies a corresponding set of rules that are to be applied to certain sessions handled by the gateway device and a corresponding set of criteria for identifying among a plurality of subscribers a corresponding group of all subscribers to which the rules are to be applied by the gateway device; receiving a request from the gateway device identifying a fictitious user; and in response to receiving the request from the gateway device, sending the plurality of policy rules packages to the gateway device for enforcement by the gateway device.

In general, in still yet another aspect, the invention features a method implemented by a policy server which determines access and conditions of service to be provided to subscribers on a plurality of networks. The method involves: receiving from a first component on one network a request to take a predefined action upon the occurrence of a specified event involving an identified subscriber on another network; storing the request; after receiving the request, continuing to manage access and conditions of service for a plurality of sessions on the network; while continuing to manage access and conditions of service for the plurality of sessions on the network, determining that the specified event involving the identified subscriber has occurred; and in response to determining that the specified event involving the identified subscriber has occurred, taking the predefined action.

Preferred embodiments of the invention include one or more of the following features. The request is a subscription request and the predefined action is to send a notification to the first component that the specified event has occurred. Taking the predefined action involves sending the notification to the first component that the specified event has occurred. The first component is an application server. Determining that the specified event has occurred involves receiving information from a gateway device which is handling a session for the identified subscriber. The predefined action involves sending information to the gateway device which is handling a session for the identified subscriber; more specifically, the predefined action involves sending a directive to the gateway device which is handling a session for the identified subscriber.

The details of one or more embodiments of the invention are set forth in the accompanying drawings and the description below. Other features, objects, and advantages of the invention will be apparent from the description and drawings, and from the claims.

DETAILED DESCRIPTION

Illustrative Network

Figure 1:
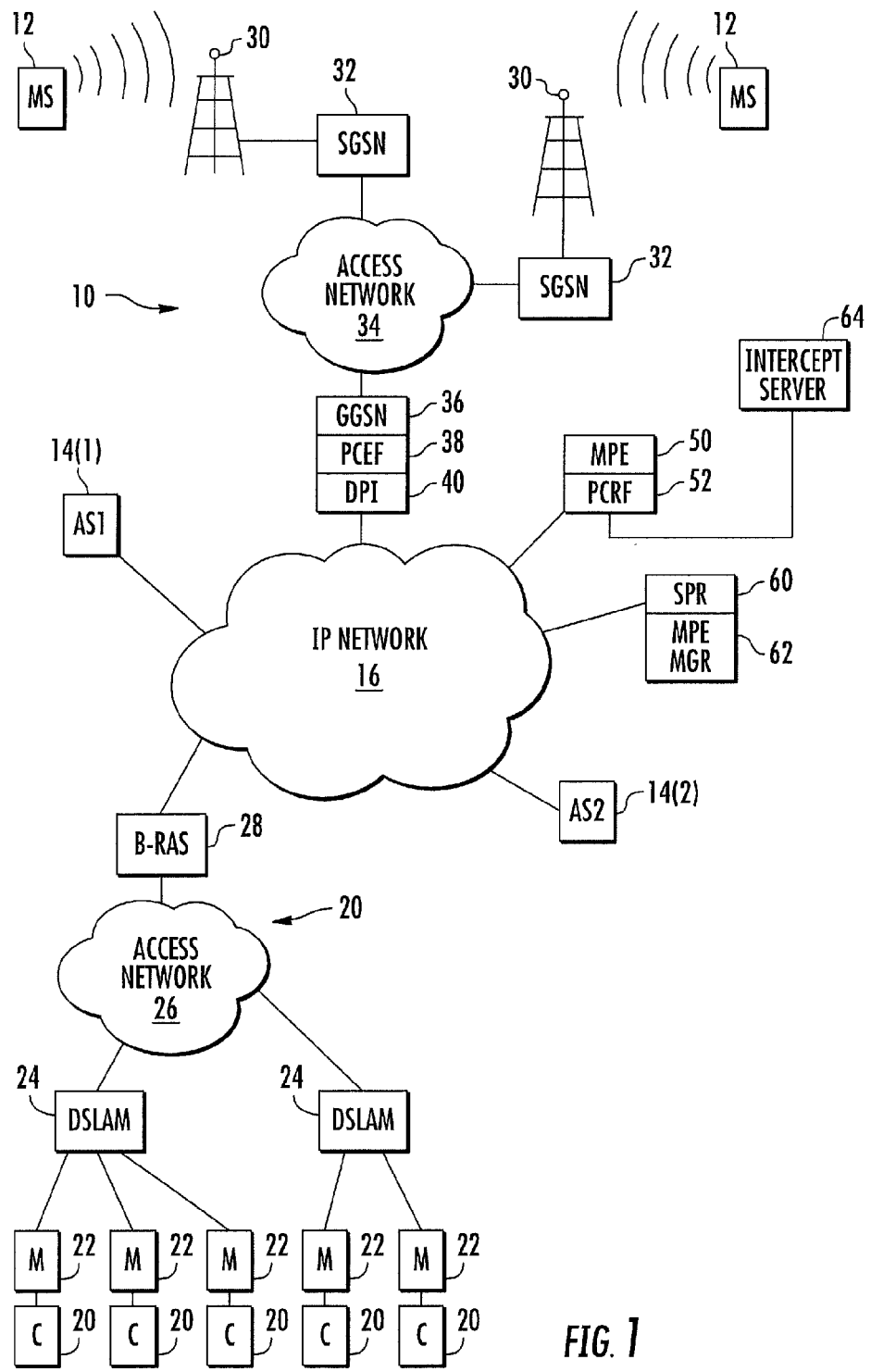
FIG. 1 is a high level diagram and a network including a fixed access network and a mobile network.

FIG. 1 shows a representative network that will be used to describe in greater detail the ideas presented herein. It includes a mobile network 10 in which mobile stations (MS) 12 communicate or connect with each other and/or with application servers 14 located elsewhere on a core network 16, e.g. an IP network. It also includes a fixed network 20 in which user devices 22 (e.g. desktop computers) establish sessions with application servers 14 also over core network 16.

Mobile network 10 includes receiving towers 30 with associated base stations and base station controllers (not shown) connected to SGSNs 32. SGSNs 32 are, in turn, connected via an access network 34 to one or more GGSNs (Gateway GPRS Support Nodes) 36. All traffic from the SGSNs goes through the GGSNs. The GGSN supports the use of GPRS (General Packet Radio Service) in a GSM (Global Service for Mobile communications) network. GPRS is a packet based communication service which allows packets to be sent and received across a mobile telephone network. And GSM is a popular standard for mobile phones throughout the world. It is responsible for interfacing between the GPRS network and an external packet switched network, such as the Internet or X.25 networks.

From the point of view of the external networks, the GGSN is like a gateway or router to a sub-network. When the GGSN receives data addressed to a specific user, it checks if the user is active. If the user is active, the GGSN forwards the data to the SGSN serving that mobile user.

The GGSN enables the mobility of the user device. It has a number of functions but the ones that are particularly relevant to the embodiments described herein include: storing the SGSN address of the user, storing the user's profile, performing authentication and charging functions, and QoS and PDP context management.

The SGSN is a Serving GPRS Support Node. It is responsible for the delivery of data packets from and to the mobile stations within its geographical area. Its task include packet routing and transfer, mobility management, and authentication and charging functions, to name a few.

Within GGSN 36, there is a PCEF (policy charging enforcement function) 38 and a DPI (Deep Packet Inspection) function 40. PCEF 38 enforces the rules for the sessions handled by GGSN 36. DPI 40 enables GGSN 36 to snoop the packets for details about various layers of the data packet. DPI 40 may be an integral part of GGSN 36, as implied by FIG. 1, or it can be a separate box through which communications between GGSN 36 and IP network 16 pass.

Located elsewhere on the core network is a Multimedia Policy Engine (MPE) 50 with associated PCRF (Policy and Charging Rules Function) functionality 52. MPE 50 is a policy server that among its many functions controls who is allowed onto the network and the QoS and bandwidth that is applied to that user. This aspect of its operation is implemented by PCRF 52. PCRF 52 makes the policy decisions and is responsible for sending commands to the GGSNs to implement those policy decisions.

Access requests by subscribers or users go to MPE 50. PCRF 52 within MPE 50 evaluates these requests and either approves or denies them, depending on availability of network resources and policies or rules that are available to MPE 50. If the request is approved, PCRF 52 instructs the appropriate gateway device (e.g. GGSN) 36 to reserve bandwidth and QoS for the session. Its extended functionality includes keeping track of and monitoring the state of the network (what is happening on the network, the state of the sessions, etc.) and making policy decisions based on the state of the network. In general, the gateways are not permitted to service traffic without authorization from PCRF 52.

PCRF 38 and PCEF 52 are peers that communicate with each other to implement bandwidth, QoS, and charging policies.

There is also a System Profile Repository (SPR) 60 which stores user-related information and user profiles for use by MPE 50 and the PCRF 52. In the described embodiment, it is part of an MPE manager 62 that serves to configure all kinds of policy rules that go into the PCRF. However, SPR 60 could be separate from MPE manager 62.

There are also application servers 14(1) and 14(2) (AS1 and AS2) located elsewhere on the IP network. There are many different types of application servers. For example, application servers may include Yahoo web servers, file upload servers, video servers, Xbox servers, and VoIP servers, just to name a few.

Fixed network 20 includes computers 20 (e.g. desktop computers, set top boxes, game consoles, etc.) located at subscriber's locations (e.g. homes or businesses). Each computer 20 communicates with a corresponding DSLAM (Digital Subscriber Line Access Module) 24 in its geographic area through a corresponding DSL (Digital Subscriber Line) modem 22. Communications from DSLAMs 24 pass over an access network 26 to the (Broadband Remote Access Server) B-RAS 28.

DSLAM 24 aggregates the digital data streams coming from a number of subscribers onto a single high capacity uplink (ATM or Gigabit Ethernet backhaul) to the Internet Service Provider (ISP). At the ISP, B-RAS 28 processes the data streams from the multiple subscribers. In effect, B-RAS 28 provides session termination and subscriber management functions such as authentication, authorization, accounting (AAA) and IP address management. In other words, among other things, it authenticates the subscriber's credentials, validates the users access policies, and routes the data to its respective destinations on the IP network.

Note that the mobile access network likely contains additional SGSNs (or/and other types of access gateways) and layer 1-2-3 connectivity between them and between SGSNs and GGSNs (e.g. IP over fiber or tdm links). Similarly, the fixed access network also likely contains additional DSLAMs (or/and other types of fixed access gateways) and layer 1-2-3 connectivity between them and between DSLAMs and BRASs (e.g. IP over ATM over fiber or IP over Ethernet over fiber). This additional detail was omitted from the figure to simplify it.

Policy Rules Packages

In the described embodiment, a new type of policy rules package is defined for the mobile network. In general, it is a set of policy rules that are associated with a group of users who are identified by a set of selection criteria. In other words, the users for which any given policy rules package is intended are all users who meet the criteria specified for that particular policy rules package. The rules are system based rules (e.g. trigger based on time of day, tier level of user, application being accessed) as opposed to user-based rules which are particular to a specific user. One category of system rules that the policy rules packages are used to deploy are the geographical-based rules. An example of a geographical-based rule is a rule that says that all users in a specific geographical area of the access network are to receive an upgrade in service at a specified time and that upgrade will last for 2 hours.

In the described embodiment, these policy rules packages are associated with a fictitious user, e.g. "broad user." The user is a fictitious user in that no actual subscriber exists and a session does not exist for the fictitious user and need not exist for any user that might qualify according to the user selection criteria in the package in order to push the policy packages for that broad user to the GGSN/PCEF. This, of course means that the GGSN/PCEF is programmed to recognize the "broad user" category. In contrast, conventional Diameter commands are session-oriented, which means they require that a user session exist. Stated differently, policy rules that are sent to the GGSN using the conventional Diameter commands are user-specific and are only for existing sessions.

The policy rules package specifies a set of attributes of the subscribers to which the policy rules are to be applied. The members of the group are typically implied. For example, the members of the group might be all subscribers using fixed devices which are located within a certain geographical area or who are online during a certain specified period of time. The policy rules package also defines a set of policy rules that are to be applied to certain types of sessions for those subscribers. For example, the policy rule might be to increase the bandwidth for the next two hours for all sessions of a particular type and involving members of the specified group of scubbribers. In this case, the policy rules might be implemented immediately upon being disseminated. Alternatively, they could just as well be of a type that occur upon a specified trigger event that takes place at some later time or whenever a set of users meeting the criteria are online.

Note that these policy rules packages enable the system to perform a massive update of many users with a single message that changes the policy that is applied to a representative of that group. Rather than having to change the policy rules being applied to each user one at a time, which is required under the prior art approach, a policy rules package can be generated that defines the group of users to which it applies and the PCEF will apply the policy rules to all members of the group at once.

Another innovative aspect of the policy rules packages is that the MPE manager and the PCRF can update them on the fly. In other words, the MPE manager can update a policy rules package, send it to the PCRF and then have the PCRF push it to the relevant PCEFs, which will if appropriate immediately implement the policy changes that are required by the updates.

Figure 2:
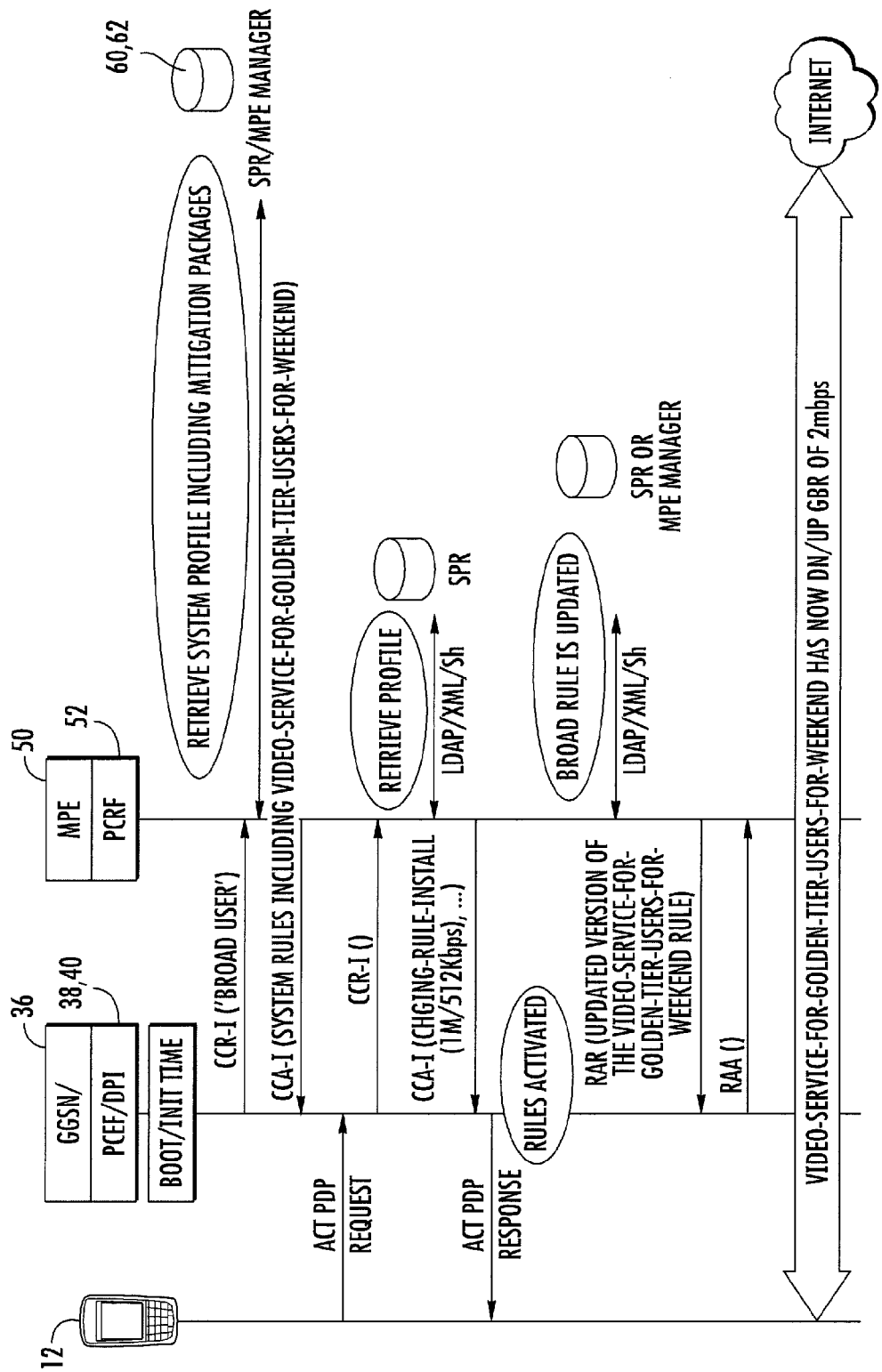
FIG. 2 is a ladder diagram illustrating message exchanges in the mobile access network of FIG. 1.

FIG. 2 illustrate the operation of a system which implements the policy rules packages mentioned above. FIG. 2 presents as a ladder diagram an exchange of messages that take place in a mobile network that includes GGSN 36, multimedia policy engine (MPE) 50 and mobile device (e.g. cell phone) 12. Within GGSN 100, as previously noted in connection with FIG. 1, there is PCEF module 38, which that implements the PCEF functionality, and DPI module 40, which implements deep packet inspection capabilities. Inside MPE 50 there is PCRF module 52, which implements the PCRF functionality. The network also includes SPR 60 and an MPE manager 62. In this described embodiment, PCRF 52 and PCEF 38 communicate by using the Diameter protocol. The Diameter protocol is a computer networking protocol for authentication, authorization and accounting. It is defined by RFC 3588 (http://tools.ietf.org/html/rfc3588). It establishes the minimum requirements for an authentication, authorization and accounting protocol.

One of the first things the GGSN does after it boots up is to send a CCR-I( ) command to the MPE asking for the policy rules packages associated with the "broad user" class. The CCR-I command is a Diameter protocol command which is referred to as a credit control initiation request. This request seeks to retrieve all policy rules packages that are relevant to the particular GGSN and are intended for groups of subscribers identified by their attributes rather than their specific identities (i.e., subscribers who are members of groups defined by the policy rules package). In response to receiving the CCR-I( ) command, the PCRF retrieves from the SPR and the MPE manager all system profiles including the policy rules packages described above. The PCRF then passes these system profiles including the policy rules packages to the PCEF within the GGSN using a CCA-I (credit control acknowledgement) command. The PCEF stores these system profiles locally for use when subscribers come online.

When a subscriber comes online, the subscriber's mobile station sends a session request to the GGSN. In the described embodiment, this request is in the form of an "Act PDP Request" which solicits PDP (Packet Data Protocol) context (i.e., packet session attributes). That request indicates the location of the subscriber which is known by virtue of the cell tower to which the subscriber is connected.

As a result of processing that session request, the PCEF within the GGSN sends an inquiry to the MPE in the form of a CCR-I command. This notifies the MPE that a new session is being requested by the subscriber, who is identified in the command, it seeks authorization for setting up a session for that subscriber, and it asks for bandwidth, QoS, and charging policies to be applied to the new session for that subscriber.

The PCRF retrieves from the SPR the user profile for that particular subscriber. The user profile indicates what the authorizations are for the user, the charging functions that will apply to the session, and the bandwidth and QoS to apply to the session. The PCRF then passes the information from the user profile to the PCEF in the GGSN via a CCA-I command (credit control acknowledgment command).

Assuming the requested session is authorized, the PCEF sets up the session with the appropriate charging and QoS attributes and sends a response (in the form of an Act PDP response) to the subscriber's device. This acknowledges that a connection was made. If no connection was made, the subscriber's device generates an error message indicating that fact to the subscriber.

What was just described about setting up a session is the conventional way in which sessions are established and the retrieval and forwarding of policy decisions is session-oriented. However, if the subscriber is a member of a group defined by one or more of the broad user policy rules packages, then those policy rules are also applied to the new session of the subscriber. In that case there may be conflicts or inconsistencies among the policy rules for the subscriber. For example, the user profile may specify that the subscriber receive a particular bandwidth and QoS, but an applicable policy rules package might require that the bandwidth to be provided be reduced during the time period that the subscriber is asking to set up his session. The decision of which policy rules take precedence and the resolution of conflicts can be made by the PCRF before pushing the policy rules or it can be made by the PCEF which enforces the applicable rules. In this case, the policy rules package would obviously take precedence and thus it is tagged with a higher priority than the user-specified policy rules. In other words, the use of priority tags on the policy rules can make the decision by the PCRF or the PCEF of which policy rules to apply much easier.

The operator of the MPE manager can update the policy rules packages at any time and have the MPE manager send these updates to the PCRF, which then pushes them to the PCEF. This is an example of dynamically updating the policy rules packages on the fly. An example of a dynamic update would be a rule that requires that all users to which the rule applies (e.g. video service Golden tier users) are to immediately receive for a specified subsequent period of time enhanced treatment as specified by the update rule.

In the described embodiment, PCRF pushes the updates to the PCEF using a RAR( ) command (a Re-Authorization Request command). RAR( ) is another Diameter command which provides a way for the PCRF to push unsolicited information to the PCEF. The PCEF acknowledges receipt of the update by sending a confirmation message in the form of a RAA ( ) command (i.e., a Re-Authorization Answer command).

There are various ways in which the update can be sent to the PCEF. One way involves sending an entirely new policy rules package which replaces the prior policy rules package. Another way involves sending only the changes to an identified policy rules package. The actual changes could be included in the transmission or they could be in the form flags identifying what has changed along with pointers and instructions to download the actual changes from a location identified by pointers.

This approach can also be used in connection with the to the creation of new policy rules packages. At any time the network operator can use the MPE manager to generate a new policy rules package and have the PCRF push it to the PCEF.

The triggering of the policy rules package can take place at the PCRF, in which case in response to a trigger (e.g. a time of day trigger), the PCRF pushes the policy rules package to the PCEF for immediate implementation. Alternatively, the triggering can take place in the PCEF in which case the PCRF push the policy rules package to the PCEF and that package includes a trigger which will let the PCEF know when to apply the policies contained within the policy rules package.

Layer 7 Filtering

The current way of filtering at the GGSN/PCEF/DPI is by a 5-tuple (Src IP, Ddst IP, Src port, Dst Port, transport protocol) which is limited in terms of its granularity. More specifically, it applies to the layer 3 and layer 4 information in the data packets. In the embodiments described herein, however, a layer 7 (application layer) filter is implemented to identify flows of packets/messages which belong to a particular service for which a rule is to be applied/enforced (e.g. download of rated R movies or download of movies/pics from a particular black-list site).

The rules that PCRF sends to the PCEF typically have two key components: input and output (condition and action). The input/condition is what the rule applies to, e.g. apply to all traffic from particular IP address and port #. The output/action relates to what action is taken upon satisfying the condition, e.g. apply QoS or apply new charging characteristics. This layer 7 filtering modification discussed herein affects the input/condition of the rule.

Using the capabilities of the DPI, the PCEF looks at application layer (e.g. HTTP) and applies filters based on information extracted from the application layer. A specific example is a rule that applies a lower bandwidth for all subscribers who are downloading from a specific URL.

It may not be practical, however, to try cover all of the possible applications that can be identified through the application layer of the packet. In that case, one can filter only key layer-7 protocols which are widely used by applications or services. This involves using key fields of those layer-7 protocols as components of the layer 7 filter. Most of these key protocols are text based, which makes the use of these filters simple. Examples include: HTTP (key fields: GET or PUT command, URL, Content-Type, Content-Length, 200-Ok return code); SMTP (key fields: HELLO command, MAIL FROM/RCPT TO commands and URLs (From/To email address), DATA command+key words in the content, From/To/CC/Date/Subject+key words in them); RTP (key field: PT field thereby enabling certain codecs to be blocked or throttled). A similar approach can be used to SIP, FTP, and Skype, to just name a few other examples.

With this layer seven capability, it should be apparent that the policy rules packages that are dynamically implemented have the ability to trigger based on information extracted from the application layer and thus can implement a finer level of granularity in the application of policy rules.

Network Awareness

As indicated in FIG. 1, a network can be a combination of a number of different sub-networks. Typically, the sub-networks and the devices on them have no awareness about the other sub-networks which make up the overall network. FIG.

1 illustrates two network types, namely, the mobile access network and the fixed access network. In that example, the GGSN on the mobile network typically has no knowledge of when a subscriber also connects to a fixed access network and uses a gateway on that fixed access network to visit an application server (e.g. yahoo.com).

The PCRF was originally developed to serve primarily as a policy server, e.g. authorize a particular user and allow that particular user to access a particular resource. This involved controlling gateways on the networks to allow or deny access and to determine the conditions that apply to that access (e.g. bandwidth and QoS).

However, because of the central role that the PCRF plays in the network, it can also serve to propagate information from one network to another network. For example, it can collect and propagate information about the activities of a subscriber on one network to devices (e.g. application servers) that are on another different network. The PCRF can thereby serve to make devices on the various different interconnected networks aware of each other. This propagation of information, in turn, makes possible providing new services based on that shared awareness.

An example is the following. Assume a user of a cell phone makes VoIP call using a VoIP server. During the call, the user drives through a tunnel and looses his connection (i.e., loss of bearer signal). As a rule, the VoIP server will have no awareness that there was a loss of bearer signal. The PCRF, however, has access to this information by virtue of its connection to the PCEF and the GGSN through which the mobile connection was established. So, the PCRF can notify send the VoIP server which can then take whatever action is appropriate.

In the described embodiment, the sharing of such information is accomplished through a subscription feature. Devices on the network (e.g. the VoIP application server) can subscribe through PCRF to receive notifications of such events. The PCRF pushes a rule to the PCEF in the GGSN that is servicing the mobile subscriber and that rule instructs the PCEF to notify the PCRF when a loss of bearer signal for the subscriber occurs. The PCRF in turn notifies the application server.

Another example involves a corporate server. This corporate server can subscribe to receive notifications from the PCRF of presence events for particular users. Thus, when a group of identified users come online, the corporate server will be made aware of this by the subscription feature and thus it will be able to take action, such as bringing users together on the fly to a conference port.

Figure 3:
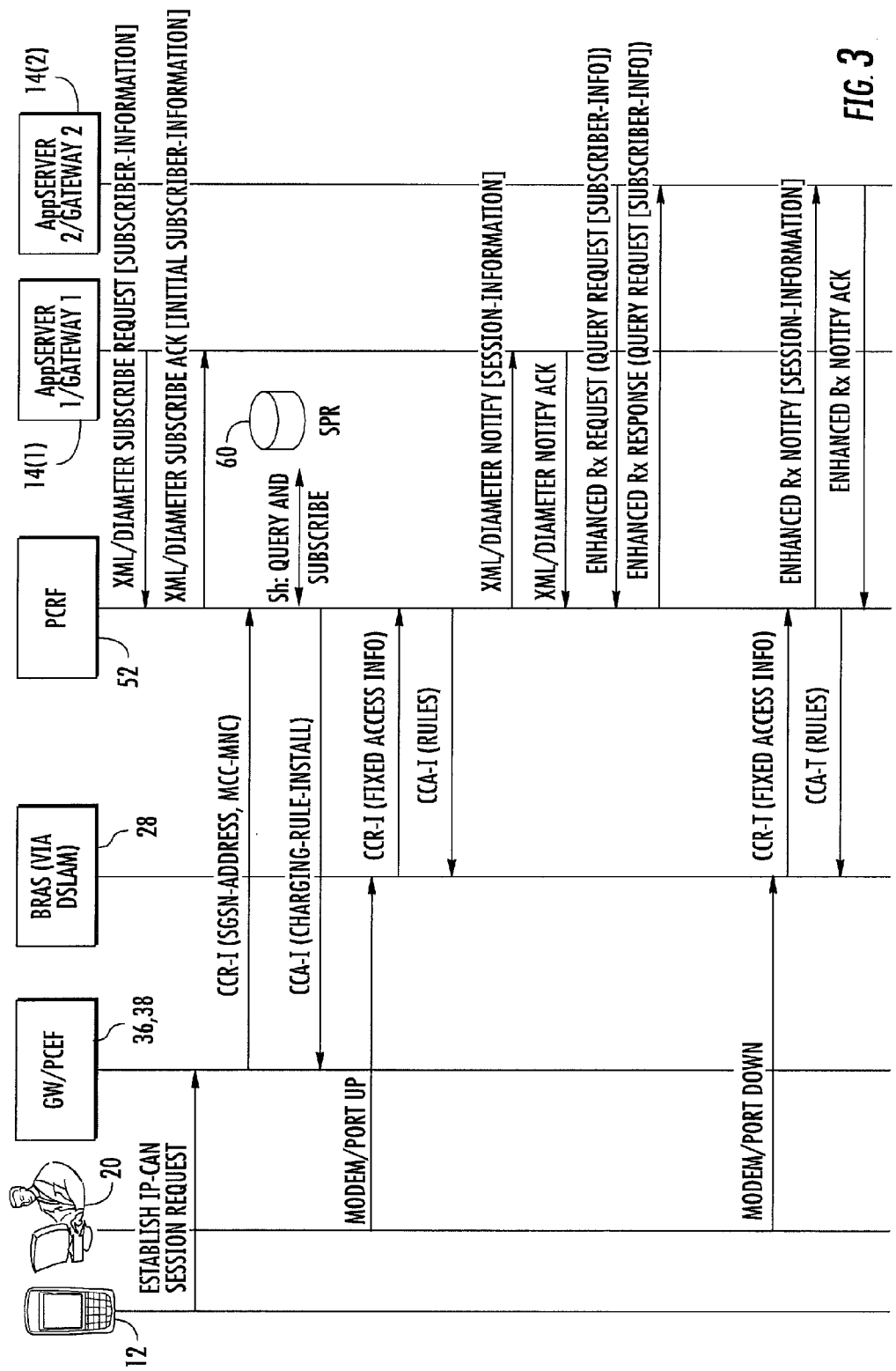
FIG. 3 is a ladder diagram illustrating message exchanges in the network of FIG. 1.

FIG. 3 shows a ladder diagram of the message exchanges that take place in a system that implements this subscription feature.

In this system, there is the subscriber's mobile device (e.g. cell phone) 12 and desktop computer 20, which for purposes of this example is also under the control of the same subscriber. These devices communicate over a network with application servers 14(1) and 14(2) through corresponding gateways. The cell phone interfaces with the core network through GW 36 (e.g. GGSN) which includes the PCEF 38 capabilities. Similarly, the desktop computer 20 connects to the IP network through B-RAS 28 via a DSLAM (Digital Subscriber Line Access Multiplexer).

The PCRF performs the normal policy server functions relating to controlling access to the various networks and determining the QoS and bandwidth assigned to those connections. As part of its normal operation, the PCRF receives information about subscribers as those subscribers establish and terminate their online connections or sessions and the PCRF stores this information in a local memory or local storage such as the SPR for use in making its policy and enforcement decisions. In addition, PCRF also includes functionality that enables various entities on the network to subscribe to notification services provided by the PCRF. The notification services enable the subscribing entity to receive notifications of particular events.

For example, in the illustrated embodiment, application server 14(1) subscribes to receive notifications from the PCRF about events involving an identified subscriber. It does this by sending a subscribe request to the PCRF via, for example, an XML interface or the Diameter protocol interface (see XML/Diameter Subscribe Request). The PCRF responds with an acknowledgement message (see XML/Diameter Subscribe Ack). The acknowledgement message might also contain information about the subscriber that is relevant to the notifications that were requested. For example, the subscription may ask that notifications be sent to the application server whenever the identified subscriber initiates a session on the fixed network. If the subscriber already has an existing session when that the subscription request is sent, the PCRF which is storing the relevant information about the subscriber either locally or in the SPR will include that information in its acknowledgement to the application server.

Note that FIG. 1 implies that there are various ways of sending the request to the PCRF. One could use the Diameter protocol. However, it is somewhat restrictive since it was not developed for this purpose. To support some requests, the Diameter protocol might need to be extended or enhanced carry the required information. Alternatively, one could use other API methods or interfaces for communicating information that are not so restrictive as the Diameter protocol. Examples of other methods or interfaces includes Java, Cobra, XML, other languages that support remote function calls.

The information that may be sought through the notifications for which subscriptions are sent include a wide range of possibilities. For example, it might seek user location, network access type, that a session has started, that a session has terminated, etc.

When a mobile user comes online, it sends a session request to the gateway to set up a session. The gateway, in turn, sends a CCR-I command to the PCRF including information about the location of the subscriber (e.g. SGSN address and MCC-MNC (country code and network code)). The PCRF sends a query to the SPR to determine whether the requested session is authorized, and if it is, to retrieve the policies that are to be applied to the session. The PCRF then forwards the retrieved policies to the gateway for setting up the session with the appropriate characteristics.

Next, assume that the subscriber logs into the network through the fixed device, i.e., his desktop computer. The B-RAS for the fixed network is notified of the activation of the subscribers modem port. The B-RAS then sends a CCR-I command to the PCRF seeking access authorization and the policy to apply to the connection. The PCRF retrieves the relevant policy from the SPR and then via a CCA-I acknowledgement message forwards it to the B-RAS for setting up the requested connection.

Because application server 14(1) has subscribed to receive notifications of when this subscriber comes online through a fixed device, the PCRF notifies application server of the new presence of the subscriber on the fixed network (see XML/Diameter Notify message). The application server responds with an acknowledgment of having received that notification message (see XML/Diameter Notify Ack message). And the application server can use this acquired awareness to provide the particular services it supports, e.g. notify of the presence of the subscriber on the network.

The other example illustrated in FIG. 3 involves application server 14(2) subscribing to receive notifications of when the specified subscriber is online in a fixed network along with information about the connection. The PCRF stores that subscription request in local memory and/or the SPR. The vehicle for sending this request is an Enhanced Rx Request, which is an example of extending the Diameter protocol to achieve the functions required in this context. In this example, the subscription is to receive notifications and other subscriber-related information when the subscriber goes online or goes offline from the fixed network. The PCRF, which is storing information indicating that the subscriber is currently online, acknowledges the request and sends information to the application server indicating that the subscriber is online.

Later, when the subscriber shuts down his connection, the B-RAS notifies the PCRF of this event by sending a CCR-T message. And the PCRF acknowledges receipt of this message by sending back a CCA-T message. Since there is a subscription pending for application server 14(2) to be notified of such events, the PCRF also sends a message notifying to the application server that the subscriber has shut down his connection (see Enhanced Rx Notify). And the application server acknowledges this by sending back an acknowledgment message (see Enhanced Rx Notify Ack).

Another example of the valuable role that the PCRF can play as a result of its "central" location and awareness of what is going on in all networks to which it is connected relates to the handling of charging information.

Assume that one of the application servers collects charging data associated with calls made by subscriber over their mobile devices. The PCEF on the other had typically collects charge records not for phone calls but for data activity of subscribers that its sees. Another application server might perform the billing function which involves collecting the charging records from the PCEF and the charging data from the first application server. It would be very desirable to enable the PCEF to correlate its charging data using the same identifiers that are used by the first application server which is collecting billing information for the phone calls. In other words, it would be beneficial for PCEF to receive charging correlation data from the first application server that would enable it to attach identifies to its records. So, when the PCEF sends its charging records to the billing application server, that server can easily correlate the PCEF data with the charging data for the phone calls. The first application server can use the fact that the PCRF is aware of the PCEF's which are collecting charge records for data activity and instruct it to forward the correlation data to those PCEFs. Without the network awareness of the PCRF, the first application server would have no awareness of the PCEFs or of how to get the correlation data to them.

In the examples presented above, notification subscriptions were used in connection with the PCRF to cause information to flow from the PCEF to the application servers. However, the PCRF, because of its network awareness, could be used to flowing information in the other direction, namely, from the application servers to the PCEFs. An example of this involves an intercept server. An intercept server is a server which collects information on the online activities of specific subscribers (i.e., target). Intercept servers would typically not be aware of where the target is active on some other part of the network or even whether the target had an active session or connection on some other part of the network. The PCRF, on the other hand, because of its central role, would be aware of that information. All subscriber connection requests must go through the PCRF to receive permission to access the network and to receive policy rules which apply to the connection. The intercept server takes advantage of this awareness by sending a rule to the PCRF which instructs the PCRF to forward a data collection directive to any gateway that reports the presence of the target. The data collection directive specifies the type of information that is to be gathered by the PCEF about the target's activity and forwards that to the intercept sever, such as Internet server 64 illustrated in FIG. 1, via the PCRF.

It should be noted that the application servers could be of many different types. Some examples are: Class-5 AS (supplementary services such as Last call redial, call transfer, music on hold, black and white list to name a few), pre paid AS, Voice Mail AS, Presence AS, Location AS, Conference AS and so on. Any of these application servers could benefit from knowing when a subscriber is on another network and could thus benefit for in the use of the subscription services described herein. For example, a Presence application server might want to be notified by the PCRF that the user is now attached via a fixed access. This would enable it to add/connect the user to an ad hoc video conference call, which may require high bandwidth and capabilities that are not available on a mobile station but are available on a desktop computer.

It should also be understood that the functionality described herein (such as the PCRF, the PCEF, and the MPE manager) can be implemented by software or code running on a processor system. Such a processor system would typically include computer readable medium storing the software or code for the relevant functionality and one or more processors on which that software or code is executed to implement the relevant functionality.

Figure 4:
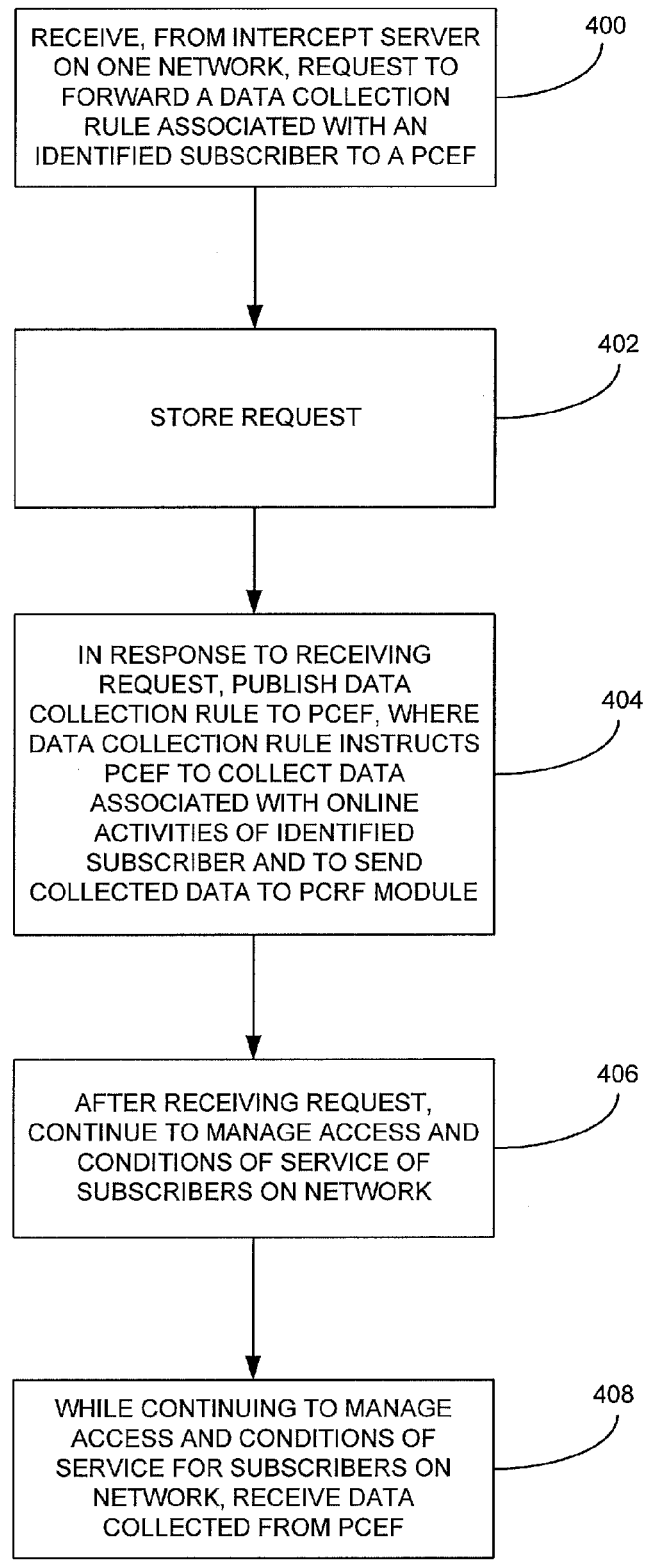
FIG. 4 is a flow chart illustrating an exemplary method implemented by a policy server which determines access and conditions of service to be provided to subscribers on a plurality of networks according to an embodiment of the subject matter described herein.

FIG. 4 is a flow chart illustrating an exemplary process implemented by a policy server which determines access and conditions of service to be provided to subscribers on a plurality of networks according to an embodiment of the subject matter described herein. Referring to FIG. 4, the steps may be implemented at a PCRF module implemented on the policy server and configured to evaluate network access requests based on network resources and stored policies and to instruct a PCEF to enforce the policies. In step 400, the method includes receiving, from an intercept server on one network, a request to forward a data collection rule associated with an identified subscriber to a PCEF. The data collection rule specifies a type of information regarding online activities of the identified subscriber for gathering by the PCEF. For example, PCRF 52 illustrated in FIG. 1 may receive a request from intercept server 64 to forward a data collection rule to PCEF 38. In step 402, the request is stored. For example, PCRF 52 may store the request. In step 404, in response to receiving the request, the data collection rule is pushed to the PCEF, where the data collection rule instructs the PCEF to collect data associated with the online activities of the identified subscriber and to send the collected data to the PCRF module. For example, PCRF 52 may forward the rule to PCEF 38. In step 406, the method further includes, after receiving the request, continuing to manage access and conditions of service of the plurality of subscribers on the network. For example, PCRF 52 may perform the aforementioned management service. In step 408, the method further includes, while continuing to manage access and conditions of service for the subscribers on the network, receiving collected data from the PCEF. For example, PCRF 52 may receive collected data from PCEF 38. In response to receiving the collected data, in step 408, the method includes sending the collected data to the intercept server. For example, PCRF 52 may send the collected data to intercept server 64.

What is claimed is:

1. A method implemented by a policy server which determines access and conditions of service to be provided to subscribers on a plurality of networks, said method comprising:
- at a policy and charging rules function (PCRF) module implemented on the policy server and configured to evaluate network access requests based on network resources and stored policies and to instruct a policy control and enforcement function (PCEF) to enforce the policies:
  - receiving, from an intercept server on one network, a request to forward a data collection rule associated with an identified subscriber to the PCEF, wherein the data collection rule specifies a type of information regarding the online activities of the identified subscriber for gathering by the PCEF;
  - storing the request;
  - in response to receiving the request, pushing the data collection rule to the PCEF, wherein the data collection rule instructs the PCEF to collect data associated with online activities of the identified subscriber and to send the collected data to the PCRF module;
  - after receiving the request, continuing to manage access and conditions of service for a plurality of subscribers on the network;
  - while continuing to manage access and conditions of service for the plurality of subscribers on the network, receiving the collected data from the PCEF; and
  - in response to receiving the collected data, sending the collected data to the intercept server.

2. The method of claim 1, wherein the PCEF is implemented on a gateway device which is handling a session for the identified subscriber.

3. A system for determining access and conditions of service to be provided to subscribers by a gateway device, the system comprising:
- a policy server, the policy server including a policy and charging rules function (PCRF) module implemented using a processor and memory, wherein the PCRF module is configured to evaluate network access requests based on network resources and stored policies and to instruct a policy control and enforcement function (PCEF) to enforce the policies and further configured to:
  - receiving, from an intercept server on one network, a request to forward a data collection rule associated with an identified subscriber to the PCEF, wherein the data collection rule specifies a type of information regarding the online activities of the identified subscriber for gathering by the PCEF;
  - storing the request;
  - in response to receiving the request, pushing the data collection rule to the PCEF, wherein the data collection rule instructs the PCEF to collect data associated with online activities of the identified subscriber and to send the collected data to the PCRF module;
  - after receiving the request, continuing to manage access and conditions of service for a plurality of subscribers on the network;
  - while continuing to manage access and conditions of service for the plurality of subscribers on the network, receiving the collected data from the PCEF; and
  - in response to receiving the collected data, sending the collected data to the intercept server.

* * * * *